US011156382B2

(12) United States Patent
Ferguson

(10) Patent No.: US 11,156,382 B2
(45) Date of Patent: Oct. 26, 2021

(54) C-SHAPED HEAT EXCHANGER TUBE AND NESTED BUNDLE OF C-SHAPED HEAT EXCHANGER TUBES

(71) Applicant: PVI Industries, LLC, Fort Worth, TX (US)

(72) Inventor: Mark Ferguson, Keller, TX (US)

(73) Assignee: PVI Industries, LLC, Fort Worth, TX (US)

( * ) Notice: Subject to any disclaimer, the term of this patent is extended or adjusted under 35 U.S.C. 154(b) by 189 days.

(21) Appl. No.: 16/193,191

(22) Filed: Nov. 16, 2018

(65) Prior Publication Data
US 2020/0158376 A1 May 21, 2020

(51) Int. Cl.
| F24H 1/20 | (2006.01) |
| F28F 1/00 | (2006.01) |
| F28F 1/40 | (2006.01) |
| B23P 15/26 | (2006.01) |

(52) U.S. Cl.
CPC .............. *F24H 1/205* (2013.01); *B23P 15/26* (2013.01); *F28F 1/006* (2013.01); *F28F 1/40* (2013.01)

(58) Field of Classification Search
CPC ...... F28F 1/40; F28F 1/426; F28F 1/06; F28F 1/08; F28F 1/006; F28F 1/025; F28F 9/16; F28F 9/18; F28F 9/182; F28F 13/08; F28D 7/1684; F28D 7/1692; F24H 1/205
See application file for complete search history.

(56) References Cited

U.S. PATENT DOCUMENTS

| 514,338 | A | | 2/1894 | Row |
| 910,192 | A | | 1/1909 | Grouvelle et al. |
| 1,549,489 | A | * | 8/1925 | Jones ................ F28F 1/06 165/160 |
| 1,641,975 | A | * | 9/1927 | Jones ................ F28D 7/005 165/177 |
| 1,991,788 | A | | 2/1935 | Cartter |
| 2,663,321 | A | | 12/1953 | Jantsch |
| 4,014,962 | A | | 3/1977 | del Notario et al. |
| 4,206,806 | A | | 6/1980 | Togashi |
| 4,393,926 | A | | 7/1983 | Appel |
| 4,589,481 | A | | 5/1986 | Mansson |
| 5,839,505 | A | | 11/1998 | Ludwig et al. |
| 6,688,378 | B2 | | 2/2004 | O'Donnell et al. |
| 6,945,320 | B2 | | 9/2005 | Harvard, Jr. et al. |
| 7,255,155 | B2 | | 8/2007 | O'Donnell et al. |

(Continued)

FOREIGN PATENT DOCUMENTS

| DE | 212016000184 U1 | 4/2018 |
| EP | 2226602 A1 | 9/2010 |

(Continued)

OTHER PUBLICATIONS

European Patent Office, Extended European Search Report for corresponding European Patent Application No. 19207747.7, dated Mar. 6, 2020 (6 pgs).

*Primary Examiner* — Steven S Anderson, II
(74) *Attorney, Agent, or Firm* — Harris Beach PLLC

(57) ABSTRACT

A heat exchanger tube includes a central tube portion having a C-shape cross-section. A pair of tube ends includes the C-shape cross-section or a different cross-section. A heat exchanger tube assembly and a method for manufacturing a C-shape heat exchanger tube are also described.

12 Claims, 11 Drawing Sheets

(56) References Cited

U.S. PATENT DOCUMENTS

| | | | | |
|---|---|---|---|---|
| 8,459,342 B2 * | 6/2013 | O'Donnell | ............ | F24H 9/0026 |
| | | | | 165/109.1 |
| 8,844,472 B2 | 9/2014 | Smelcer et al. | | |
| 2012/0006512 A1 | 1/2012 | Guo et al. | | |
| 2014/0166252 A1 * | 6/2014 | Cur | ........................ | F28B 1/02 |
| | | | | 165/157 |
| 2016/0054071 A1 * | 2/2016 | Cordova | ............... | F28D 7/0008 |
| | | | | 165/164 |

FOREIGN PATENT DOCUMENTS

| | | | |
|---|---|---|---|
| EP | 2226602 B1 * | 3/2013 | ............... F28F 1/42 |
| WO | WO-2007122685 A1 | 11/2007 | |
| WO | WO-2014099250 A1 | 6/2014 | |
| WO | WO-2017043990 A1 | 3/2017 | |

\* cited by examiner

SECTION C-C SCALE 1.75

SECTION B-B SCALE 1.75

SECTION A-A SCALE 1.75

SECTION F-F SCALE 1.5

SECTION E-E SCALE 1.5

SECTION D-D SCALE 1.5

C-SHAPED HEAT EXCHANGER TUBE AND NESTED BUNDLE OF C-SHAPED HEAT EXCHANGER TUBES

FIELD OF THE APPLICATION

The application relates to heat exchanger tubes, particularly to heat exchanger tubes for hot water heaters.

BACKGROUND

Heat exchanger tubes are used for heat transfer from a first fluid or gas to a second fluid or gas. Use of heat exchanger tubes allows the first gas or fluid to be isolated from the second gas or fluid. For example, a gas fired hot water heater typically passes heated gas from a gas fired burned through heat exchanger tubes to heat water passed over the outside of the tubes. The heat exchanger tubes are typically fixed in a pattern by a tube sheet with a pattern of holes, each of the holes accepting one end of each of the heat exchanger tubes.

SUMMARY

According to one aspect, a heat exchanger tube includes a central tube portion having a C-shape cross-section. A pair of tube ends includes the C-shape cross-section or a different cross-section.

In one embodiment, the different cross-section includes a circular cross-section.

In another embodiment, the heat exchanger tube further includes a transition portion between the C-shape cross-section of the central tube portion and the circular cross-section.

In yet another embodiment, the central tube portion includes a plurality of boss patterns.

In yet another embodiment, the boss patterns include a series of periodic boss patterns.

In yet another embodiment, the series of periodic boss patterns cause an alternating flow pattern of a gas or fluid flowing through the heat exchanger tube.

In yet another embodiment, the series of periodic boss patterns create a plurality of microchannels which cause a laminar flow.

In yet another embodiment, the series of periodic boss patterns include an alternating series of side boss pinching and middle boss pinching.

In yet another embodiment, the series of periodic boss patterns cause an alternating flow pattern of a gas or fluid flowing through the heat exchanger tube alternately between both sides and a middle of the C-shape cross-section.

In yet another embodiment, the heat exchanger tube is a hot water heater heat exchanger tube.

According to another aspect, a heat exchanger tube assembly includes a pair of tube sheets. A plurality of C-shaped heat exchanger tubes is disposed between the pair of tube sheets. Each C-shaped heat exchanger tube includes a central tube portion having a C-shape cross-section, and a pair of tube ends including the C-shape cross-section or a different cross-section. Each tube end of each tube is mechanically coupled to a tube sheet.

In one embodiment, the pair of tube sheets include a plurality of circular holes to accept and mechanically couple to a round tube end cross section.

In another embodiment, the pair of tube sheets include a plurality of C-shaped openings to accept and mechanically couple to a C-shaped tube end cross section.

In yet another embodiment, the pair of tube sheets include a plurality of openings to accept and mechanically couple to a tube end cross section in a tube end pass-through configuration.

In yet another embodiment, the pair of tube sheets include a C-shaped opening nested pattern wherein at least one end of the C-shaped openings is nested into a concave part of another C-shaped opening.

In yet another embodiment, the heat exchanger tube assembly is a hot water heater heat exchanger tube assembly.

According to another aspect, a method for manufacturing a C-shape heat exchanger tube includes: providing a cylindrical shaped tube; placing the cylindrical shaped tube into a die; and striking the cylindrical shaped tube on only one side to produce the C-shaped heat exchanger tube.

In one embodiment, the step of striking includes striking the cylindrical shaped tube on one side to produce the C-shaped heat exchanger tube for a heat hot water heater.

In another embodiment, the step of striking includes striking the cylindrical shaped tube on one side to produce the C-shaped heat exchanger tube with a periodic boss pattern.

In yet another embodiment, the step of striking includes striking the cylindrical shaped tube on one side to produce the C-shaped heat exchanger tube with a periodic boss pattern of alternating side pinches and middle pinches.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Figure 1:
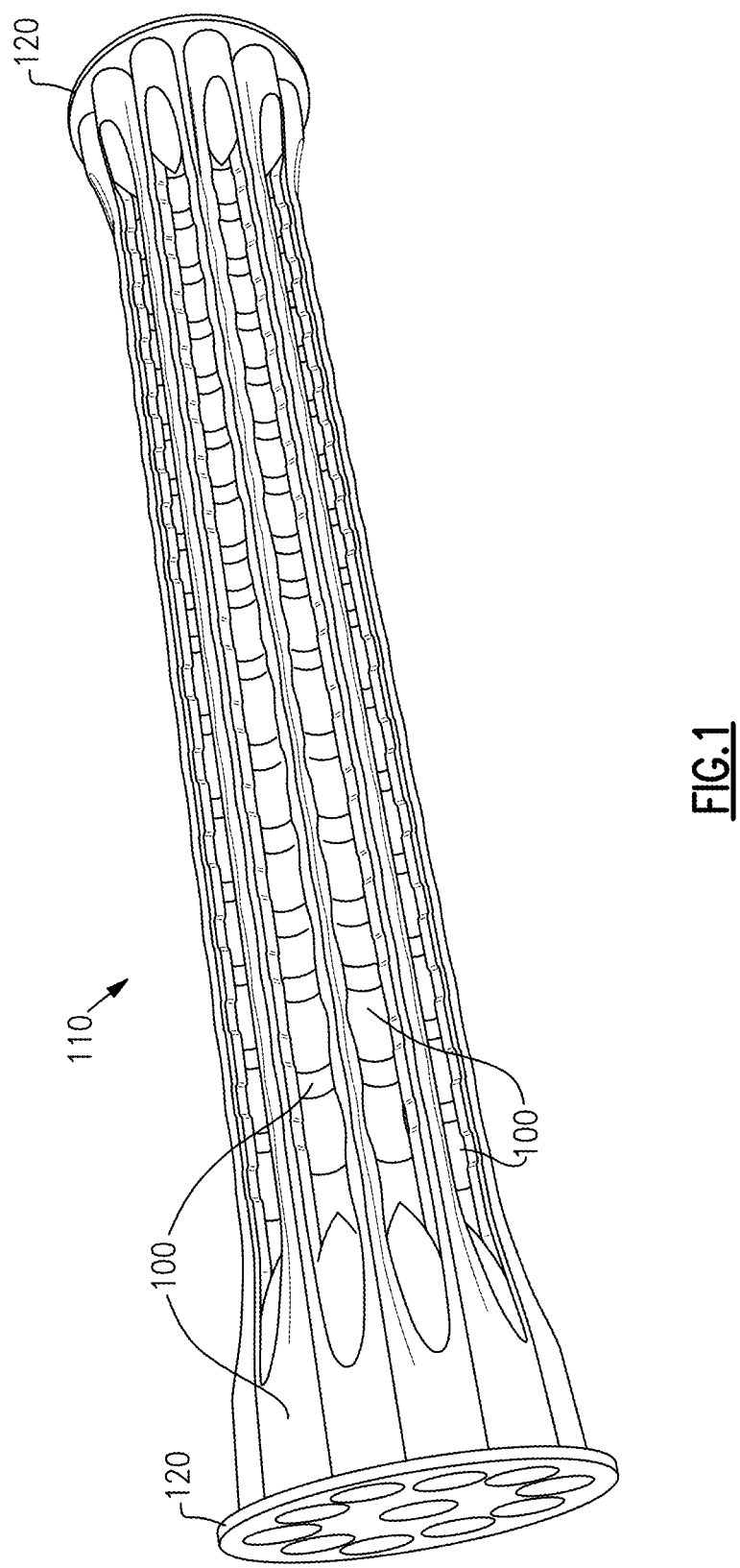
FIG. 1 shows a drawing of a plurality of C-shaped heat exchanger tubes according to the Application.

As described hereinabove, heat exchanger tubes are used for heat transfer from a first fluid or gas to a second fluid or gas. Use of heat exchanger tubes allows the first gas or fluid to be isolated from the second gas or fluid. For example, a gas fired hot water heater typically passes heated gas from a gas fired burned through heat exchanger tubes to heat water passed over the outside of the tubes. The heat exchanger tubes are typically fixed in a pattern by a tube sheet with a pattern of holes, each of the holes accepting one end of each of the heat exchanger tubes.

Heat exchangers can be made with bundles of unformed cut lengths of raw stock cylindrical tubes. Enhanced heat exchanger tubes can be further formed, such as by any suitable metal forming process, to cause the flow of the gas or fluid within each tube to be modified so as to improve the heat transfer across the tube wall between the first fluid or gas and a second fluid or gas.

Typically, in a gas fired water heater, the heated gas is passed within and through each of the heat exchanger tubes to heat water which passes around the outside of each of the heat exchanger tubes as it passes through a heat exchanger assembly canister. Alternatively, the water can also be passed through the tubes, where the heated gas is passed outside of the tubes in a heat exchanger canister. Also, for the new structures and process described in this Application, it is unimportant if the first gas or fluid is flowing in the same direction or an opposite direction from the second gas or fluid (counter flow). Those skilled in the art will recognize such structures as a shell-and-tube type heat exchanger. Shell-and-tube heat exchangers can be used for counter flow applications.

One problem of heat exchanger tubes is related to manufacturing the tubes. There is a need for a material and process to improve the efficiency of manufacture as well as to lower the cost of manufacturing heat exchanger tubes. Another problem is that, especially depending or composition and temperature, potable water can be highly corrosive.

As noted hereinabove, raw stock cylindrical tubes can be further formed, such as, for example, with dimples or shapes to convert the cylindrical tube into an "enhanced tube" with improved heat transfer characteristics. Cylindrical heat exchanger tubes are typically formed or pressed on two, three, or four sides. Each press requires another strike of a forming tool. While very hard steel is advantageous for both heat transfer properties as well as for the most robust long lasting heat transfer tubes, such very hard steel materials have proven to be too hard to practically work for the formation of multiple strike enhanced features with conventional production tooling. Therefore, there is a need for an efficient production method for the manufacture of enhanced heat transfer tubes from stock cylindrical sections of relatively hard steel materials.

Another problem is to limit deformation of the heat exchanger tube during manufacture so that metal forming of a stock tube does no cause the formed heat exchanger tube to have a diameter larger than the raw stock tube from which it was formed. For example, in formed heat exchanger tubes of the prior art, such as dimpled heat exchanger tubes, especially those formed by multiple strikes, typically some parts of the formed tubes have a maximum radius in non-round circumferential places along the length of the tube (in cross section, post formed) which exceeds the original diameter of the raw stock tube cylindrical end face cross section diameter.

There is also a need for heat exchanger tubes which can be stacked or nested, such as by tube sheet patterns, in an efficient manner where there can be more dense heat exchangers with more heat exchanger tubes per unit area of a tube sheet.

It was realized that long sought after hardened enhanced heat transfer tubes can be manufactured with relatively complex boss (emboss) patterns from relatively hard steel alloys by use of a single strike, single die method. Exemplary hard steel alloys include LDX 2205 and LDX 2101 steel. Exemplary hard steel materials LDX 2205 and LDX 2101 are available from Outokumpu company, of Helsinki, Finland. Allegheny Ludlum of Vandergrift, Pa. is another supplier. Suitable types of tube stock including LDX tube stock, are well-known and commercially available from other sources, as is particularly the case for the more common 2205 types. Alternately, any suitable raw material can be obtained and processed to the desired high strength type steel alloy.

Moreover, it was realized that were the relatively complex boss patterns are formed into a C-shaped enhanced heat transfer tube, the post boss radius can be contained by the die during single strike metal forming, so as to substantially not exceed the radius of the pre-formed cylindrical blank sections.

As described hereinabove, depending or composition and temperature, potable water can be highly corrosive. It was also realized that by use of relatively hard steel alloys, the corrosion-resistance and strength of both the heat exchanger tubes can be significantly improved for an assembled heat exchanger assembly (typically a pressurized vessel) which is more robust in strength and resistance to corrosion.

Also, by creating a patterned boss structure along the C-shaped heat exchanger tube, a more efficient heat transfer can be achieved. It was realized that such boss patterns can be made quickly and efficiently by a single strike die manufacturing method. Also, in contrast with the more complicated multiple side strike enhanced heat exchanger tubes of the prior art, the maximum radius of the formed tube can be more easily constrained to about the same radius of the pre-formed stock cylindrical tube.

The new C-shaped heat exchanger tube according to the Application, can be manufactured relatively quickly and easy as compared to enhanced heat exchanger tubes of the prior art. Because of the application of the single strike and die method of the Application, enhanced C-shaped heat exchanger tubes can now be formed from tube stock made from very hard metals. The diameter of the tube after forming substantially does not exceed the original diameter of the tube, which makes for easier and faster assembly of C-shaped heat exchanger tubes into tube sheets and a canister of a heat exchanger assembly. For example, typically each formed tube end passes through each hole of the tube sheet. Such pass-through construction has substantial benefits as more efficient for both of ease of assembly and post-assembled interlocked tube and tube sheet, providing an improved reliability and strength of the mechanical coupling.

Also, the relatively compact size of the C-shaped heat exchanger tubes allows for denser heat exchanger designs, which will reduce cost and result in smaller overall products. Further, as described in more detail herein below, in some embodiments, the tube shape cross section at each end can also be C-shaped to allow for the nesting of tubes which could potentially double the tube density.

FIG. 1 shows a drawing of a plurality of C-shaped heat exchanger tubes 100 according to the Application assembled into tube sheets 120 for a heat exchanger assembly 110 (heat exchanger canister not shown in FIG. 1). The boss patterns of the new C-shaped heat exchanger tubes 100 visible in FIG. 1, are described in more detail hereinbelow. Those skilled in the art will appreciate that "C-shaped" includes any about C-shaped structure. One indication of a suitable C-shape is that a round or tubular tube stock can be struck from only one side to form the shape by a single embossing operation that pushes in on one side of the tube stock. Also, as described in more detail hereinbelow, periodic sections of a C-shaped heat exchanger tube according to the Application can include, for example, straight lines, V sections, and curves within the about C-shape along the long longitudinal axis of the formed or embossed tube.

Figure 2:
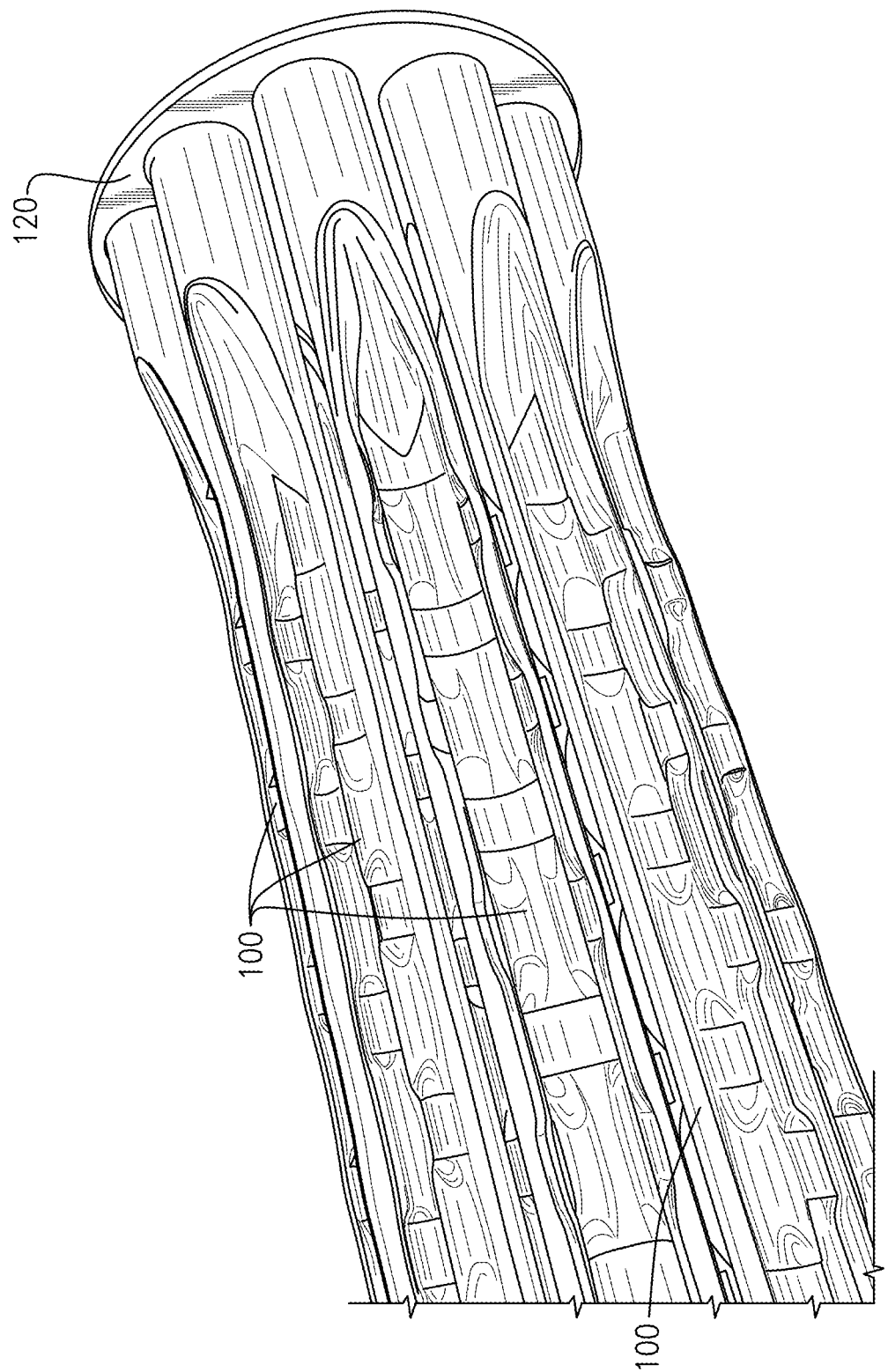
FIG. 2 shows a closeup view of the heat exchanger assembly of FIG. 1.

FIG. 2 shows a closeup view of the heat exchanger assembly 110 of FIG. 1. In this exemplary embodiment, the ends of each tube are cylindrical and fit into each corresponding circular hole of the tube sheet 120.

Figure 3A:
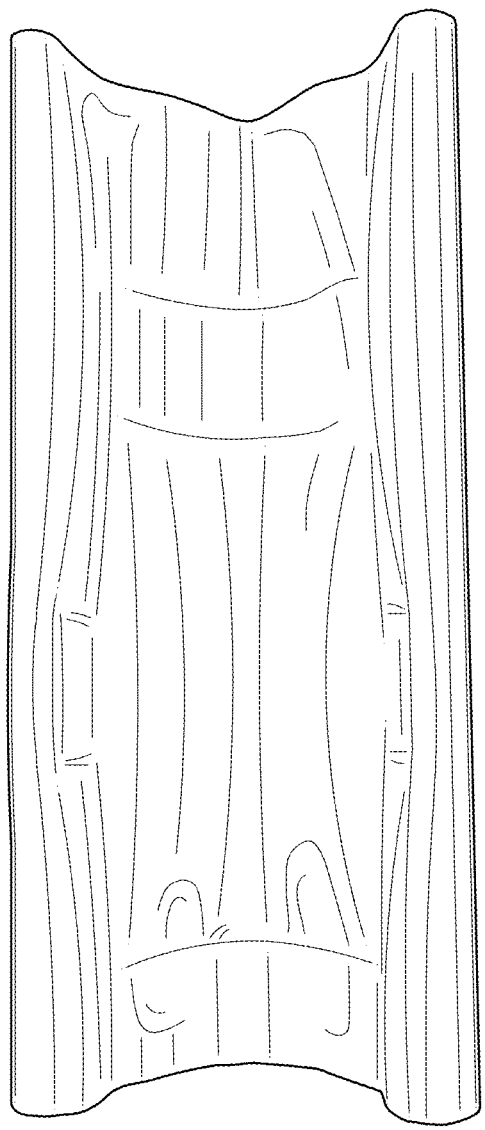
FIG. 3A is a drawing showing an exemplary periodic section of a C-shaped heat exchanger tube with cross-sections D-D to F-F.
Figure 3C:
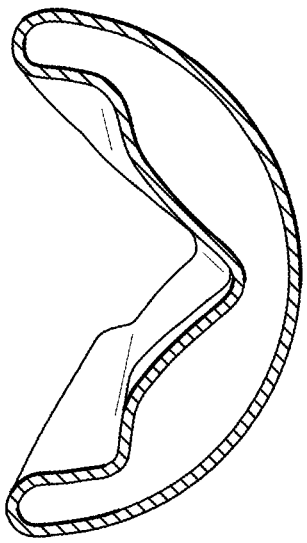
FIG. 3C is a drawing showing a D-D cross-section of the left side of the periodic section of FIG. 3A.
Figure 3B:
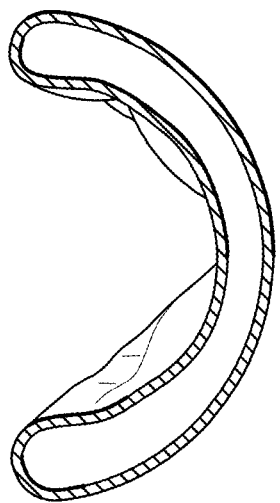
FIG. 3B is a drawing showing a F-F cross-section of the left side of the periodic section of FIG. 3A.

C-shaped heat exchanger tubes with alternating flow patterns: C-shaped heat exchanger tubes, such as the exemplary C-shaped heat exchanger tubes of FIG. 1 and FIG. 2, can include a series of periodic features, such as pinched areas made by strike or press embossing. FIG. 3A shows a periodic section of the boss patterns of the new C-shaped heat exchanger tubes 100. The various shapes of the cross-sections of the C-shaped heat exchanger tubes with alternating flow patterns are labeled for convenience by letters, such as for example, "D-D" and "F-F". As is now described in more detail, FIG. 3A shows a periodic section of cross-sections D-D to F-F. FIG. 3B is a drawing showing a F-F cross-section of the left side of the periodic section of FIG. 3A. FIG. 3C is a drawing showing a D-D cross-section of the left side of the periodic section of FIG. 3A.

Figure 3D:
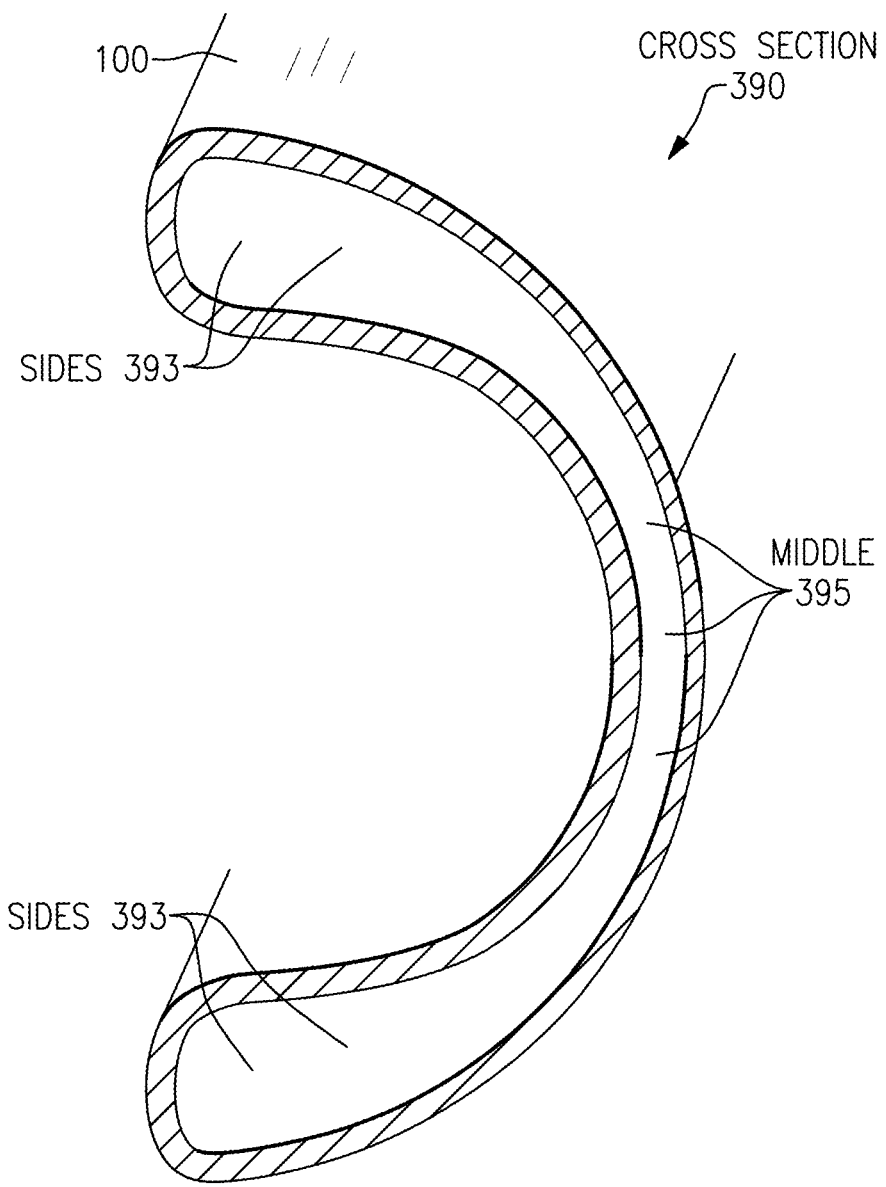
FIG. 3D is a drawing which shows another C-shaped cross-section F-F.

When describing the oscillating flow patterns of the periodic sections of the new C-shaped heat exchanger tubes 100, reference is made to the "sides" and to the "middle" of the generally C-shaped cross-sections. FIG. 3D is a drawing which shows another C-shaped cross-section F-F 390 labeled to show the interior side flow areas 393, and the middle flow areas 395. There is not so much a clear delineation between the interior side flow areas 393 and the middle flow areas 395 as much as an alternating flow between the side flow areas 393 and the middle flow areas 395 as gas or fluid flows through each of the periodic sections (FIG. 3A) of the new C-shaped heat exchanger tubes 100.

Figure 4:
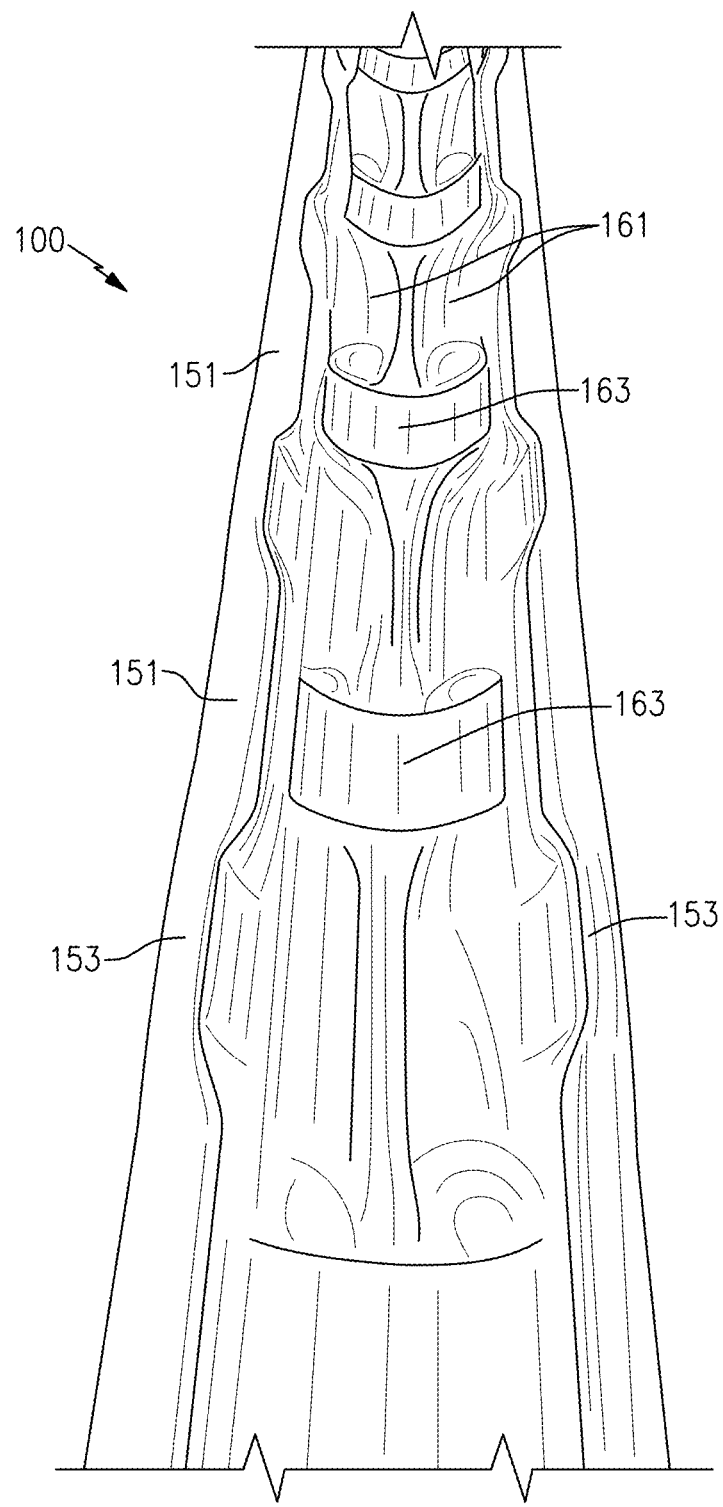
FIG. 4 is a drawing which shows a perspective lengthwise view of a portion of a an exemplary C-shaped heat exchanger tube with a periodic boss pattern.

FIG. 4 is a drawing which shows a perspective lengthwise view of a portion of a an exemplary C-shaped heat exchanger tube 100 with a periodic boss pattern. The gas or fluid flowing within the tube, e.g. from the bottom of the page to the top of the page (direction of flow is unimportant), is restricted by the side boss 153 (i.e. pinched) and the flow is forced towards the middle. Then at boss 163, the gas or fluid flowing within the tube is restricted in the middle and forced to flow more in the less restricted side portions 151. Again, at the side boss 153, the gas or fluid flowing within the tube is forced by the side boss 153 into the less restricted middle sections 161. Another benefit of such flow through the new periodic boss pattern is a significant improvement in heat transfer without significantly increasing pressure drop.

Figure 5:
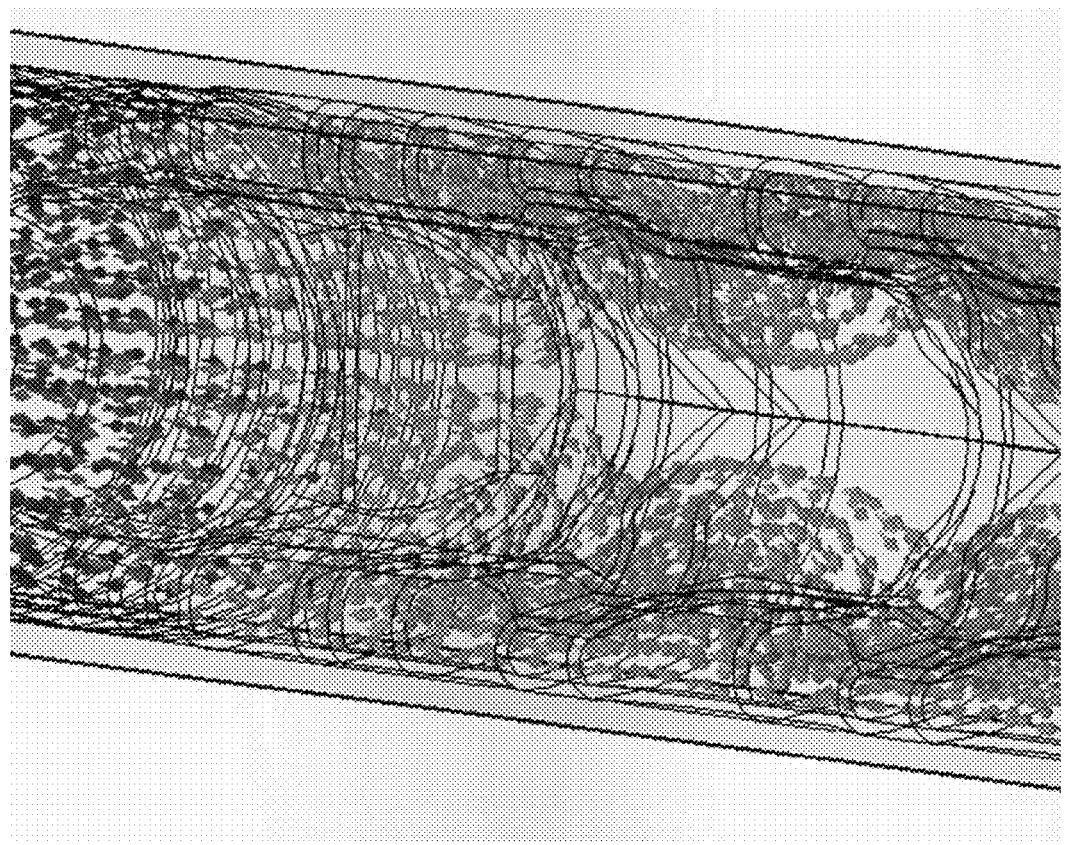
FIG. 5 is a display from a computer simulation showing a gas flow through the boss patterns of a C-shaped heat exchanger tube.
Figure 5:
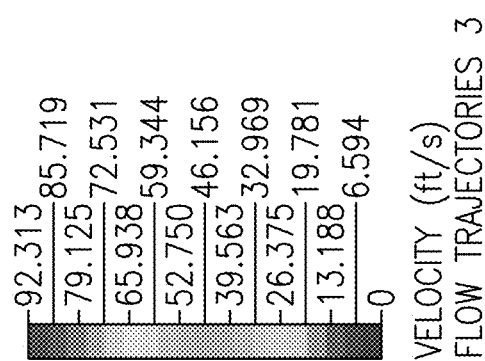

FIG. 5 is a display from a computer simulation showing a gas flow through the boss patterns of a C-shaped heat exchanger tube 100 as was described with respect to FIG. 3A and FIG. 4. SOLIDWORKS Flow Simulation was used to create the simulation of FIG. 5. The SOLIDWORKS Flow Simulation program is available from Dassault Systèmes of Waltham, Mass. Fluid flow through each of the C-shaped tubes can be seen to laminarize in certain regions of the tube. To our best current understanding, as supported by the simulations, we believe that "microchannels", areas defined as having a hydraulic diameter as <1 mm, have been formed, that result in a laminar flow with high heat transfer.

Figure 6:
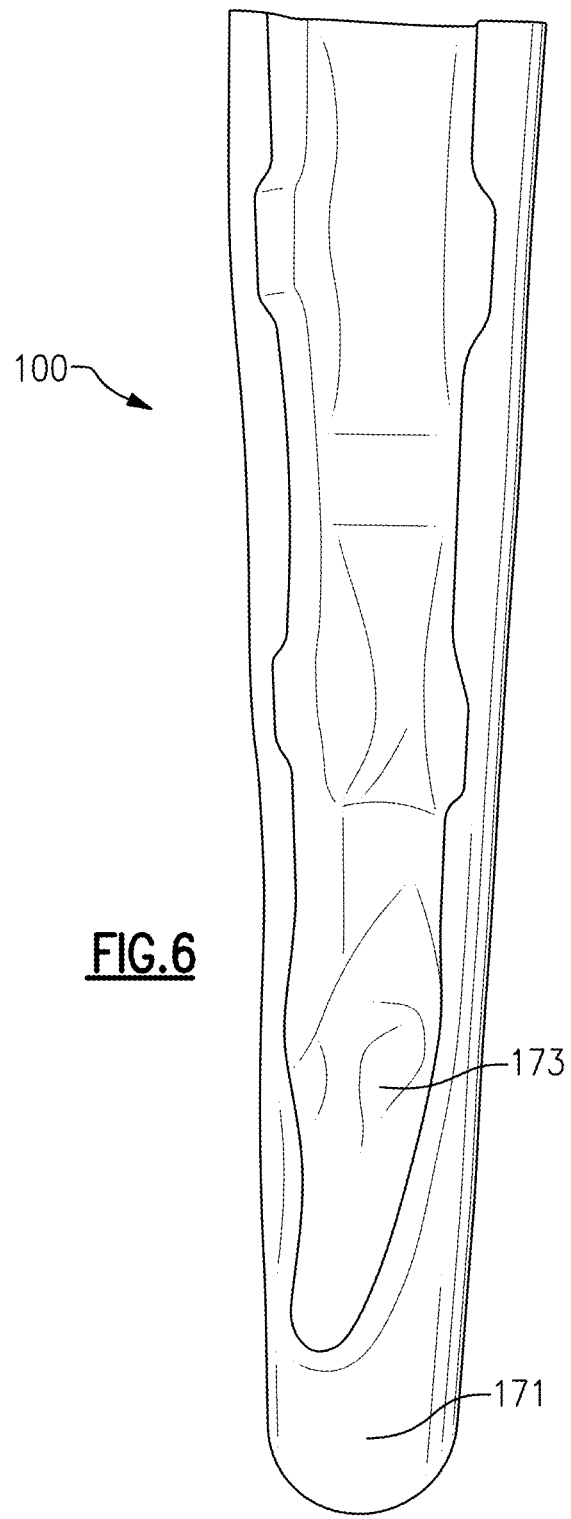
FIG. 6 is a drawing showing detail of an exemplary transition section from a circular cross-section at a C-shaped heat exchanger tube end to the periodic sections of FIG. 3A and FIG. 4.

In the embodiment of FIG. 1 and FIG. 2, each C-shaped heat exchanger tube 100 terminates into a corresponding hole in a tube sheet 120 on either end of the tube, with a circular cross-section. FIG. 6 is a drawing showing more detail of one exemplary transition section 173 from the circular cross-section at the tube end to the periodic sections of FIG. 3A and FIG. 4. In other embodiments there can be any suitable shape where each of the tubes terminates into a tube sheet. Moreover, there can be any combination of suitable shapes.

Figure 7A:
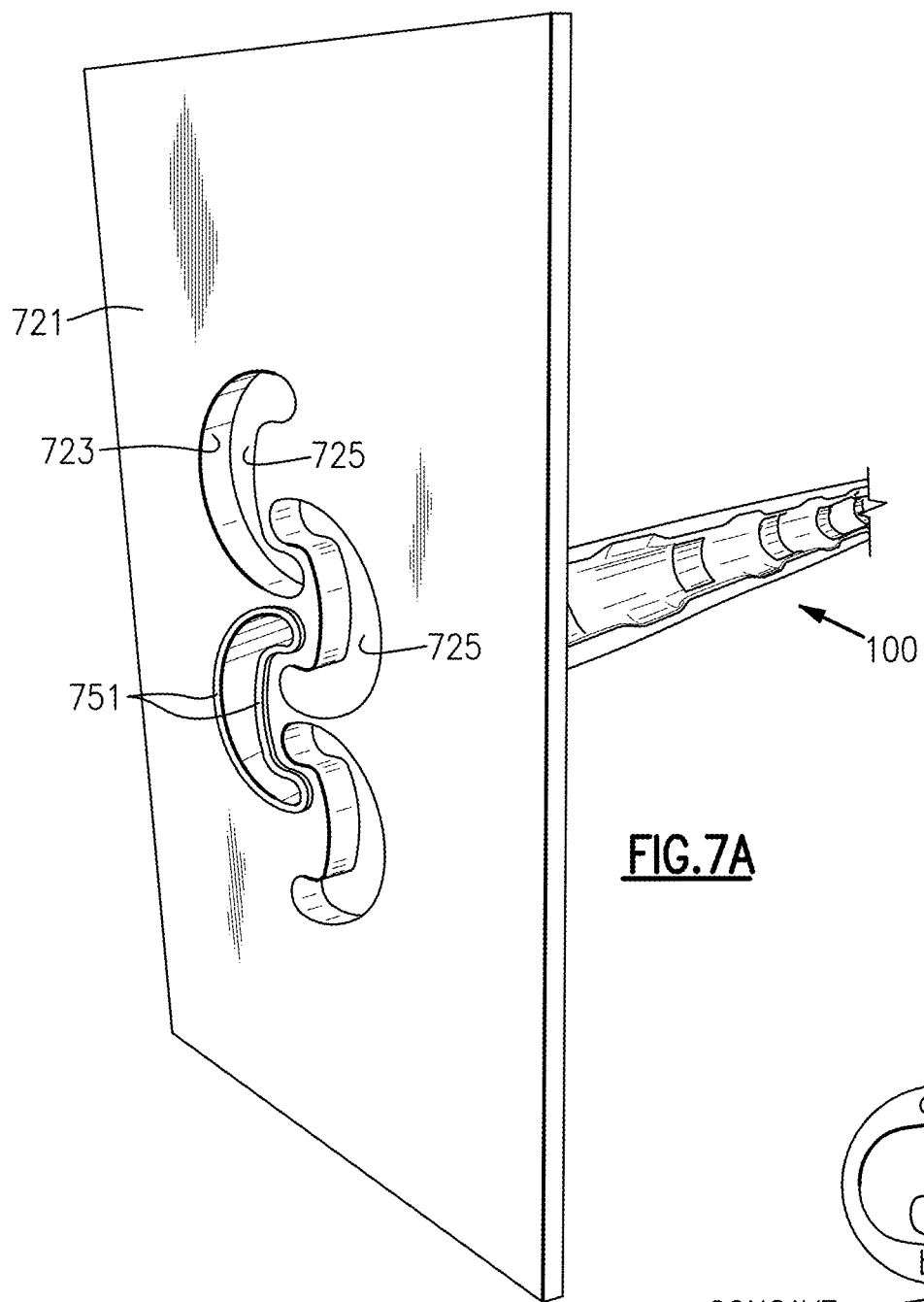
FIG. 7A shows a drawing of a perspective view of a tube sheet with nested C-shaped ends.

C-shaped ends, C-shaped holes in tube sheets: In another embodiment, it was realized that if the ends were cut or formed into C-shapes, a denser nested mounting technique can be used at the tube sheets. FIG. 7A shows a drawing of a perspective view of a tube sheet mock-up of nested C-shaped ends. There is no significance to the square shape of the tube sheet portion shown in the mock-up tube sheet 721. Typically tube sheets are round so as to fit in cylindrical shaped heat exchanger canisters. However, any suitable square, rectangular, round, elliptical, polygonal, etc. shaped tube sheet can be used in any suitable shaped heat exchanger canister, with any combination thereof. In the exemplary embodiment of FIG. 7A, what is different is that instead of the C-shaped heat exchanger tubes 100 end face circular cross section (e.g. FIG. 6, tube end 171), the tube ends now have a C-shaped cross-section 751. As shown in FIG. 7A, the C-shapes can be nested, such as where the tops and bottoms of the C-shapes of tube ends, nest within concave parts of other tube ends.

Figure 7B:
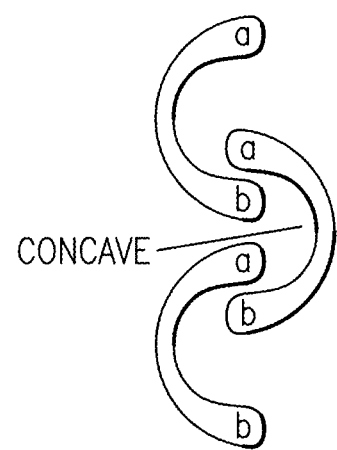
FIG. 7B shows two different C-shaped heat exchanger tubes nested into another C-shaped heat exchanger tube.

FIG. 7B shows how two different C-shaped heat exchanger tubes can be nested into another C-shaped heat exchanger tube. One C-shape tube end "a" of a first tube and one C-shaped tube end "b" of a second tube can both fit within a concave opening of the C-shape of a third tube. In a cross-section view (e.g. in a tube sheet plane), two C-shape tube ends of two different tubes can fit into the C-shape concave opening of yet another tube. In a circular tube pattern (e.g. C-shape tube ends distributed in about circular patterns in the plane of a tube sheet), each C-shape concave opening can be filled with two C-shape tube ends. In other tube sheet patterns, there can be any suitable number of C-shape concave openings left open, or with only one C-shape tube end disposed within. Any suitable arrangement of two C-shape tube ends of two different tubes in the C-shape concave opening of yet another tube, one C-shape tube end of a different tube in the C-shape concave opening of another tube, an empty C-shape concave opening, and/or any combination thereof can be used.

In the exemplary mock-up installation of FIG. 7A, the C-shaped holes 725 are defined by walls 723 cut into the tube sheet 721. Here, the end face of each of the corresponding C-shaped heat exchanger tubes 100 has a corresponding C-shaped cross-section 751. While the C-shaped cross-section 751 can be achieved by cutting a tube of the type used in FIG. 1, at the appropriate lengthwise position of such a C-shape (as was done for R&D purposes), more practically, a different die can be used so that the desired tube is achieved by the single strike method with a so patterned die in one step.

It can now be better appreciated that a heat-exchanger tube has been realized with a generally C-shaped cross-section along the length, where the initially round cross-section (pre-strike, raw stock) is only indented from one side. Also, it was realized that a bundle of tubes with C-shaped end face cross-sections (e.g. fire tubes for a gas fired water heater) can be meshed for a more compact bundle, in comparison to round cross-section. The bundle of tubes with C-shaped end face cross-sections can extend into corresponding C-shaped holes of tube sheets to form a heat exchanger insert. The heat exchanger insert can be installed into any suitable heat exchanger canister.

EXAMPLE—FIG. 8A-FIG. 8G shows drawings of an exemplary C-shaped heat exchanger tube with round end face cross-sections similar to the C-shaped heat exchanger tubes 100 of FIG. 1.

Figure 8D:
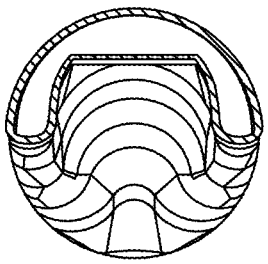
FIG. 8D is a drawing showing an exemplary boss patterned C-shaped heat exchanger tube cross-section D-D.
Figure 8C:
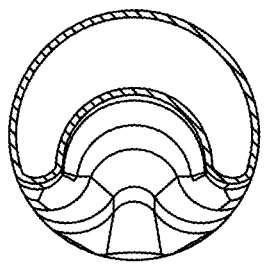
FIG. 8C is a drawing showing an exemplary boss patterned C-shaped heat exchanger tube cross-section C-C.
Figure 8B:
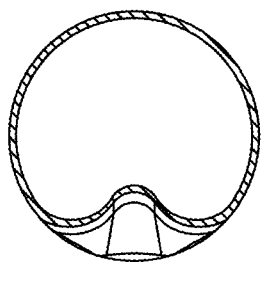
FIG. 8B is a drawing showing an exemplary boss patterned C-shaped heat exchanger tube cross-section B-B.
Figure 8A:
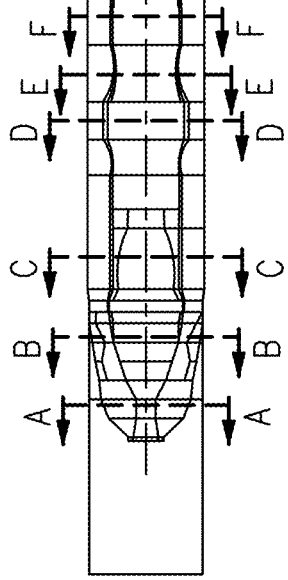
FIG. 8A is a drawing showing an exemplary boss patterned C-shaped heat exchanger tube cross-section A-A.
Figure 8G:
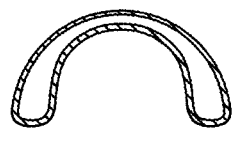
FIG. 8G is a drawing showing exemplary periodic sections of a C-shaped heat exchanger tube end in detail.

FIG. 8G is a drawing showing exemplary periodic sections of a C-shaped heat exchanger tube end in detail. The exemplary C-shaped heat exchanger tube of FIG. 8G includes about circular tube ends which transition on either side to a C-shaped periodic boss pattern of alternating side boss pinches and middle boss pinches. The small open rectangular area in the middle of FIG. 8G is understood to designate that any suitable length of a C-shaped heat exchanger tube can be used. FIG. 8A is a drawing showing a cross-section A-A. FIG. 8B is a drawing showing a cross-section B-B. FIG. 8C is a drawing showing a cross-section C-C. The cross-sections of FIG. 8A-FIG. 8C are exemplary of transition sections from cylindrical end faces to the periodic sections of the C-shaped heat exchanger tubes which cause the alternating flow pattern (similar to the transition section shown in FIG. 6).

Figure 8F:
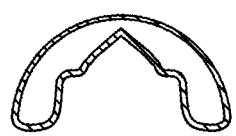
FIG. 8F is a drawing showing an exemplary boss patterned C-shaped heat exchanger tube cross-section F-F.
Figure 8E:
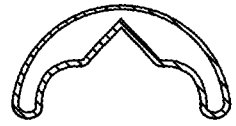
FIG. 8E is a drawing showing an exemplary boss patterned C-shaped heat exchanger tube cross-section E-E.

FIG. 8D is a drawing showing a cross-section D-D. FIG. 8E is a drawing showing a cross-section E-E. FIG. 8F is a drawing showing a cross-section F-F. The cross-sections of FIG. 8D-FIG. 8F show exemplary periodic sections of the C-shaped heat exchanger tubes.

Suitable tube stock—Any suitable tube which can be formed into a C-shape tube for a heat exchanger can be used. Typically, such tubes are formed from cylindrical stock steel tubes. Any suitable wall thickness can be used. Typically, stock cylindrical wall thicknesses (prior to forming) range from about 0.025 inches to about 0.075 inches. As described hereinabove, the new shapes and methods are particularly suited for use with relatively hard steel stock tubes, such as, for example, LDX 2205 and LDX 2101. The typical range of desirable tube stock steel harness is from about 260 to 290 (HB).

In summary, a heat exchanger tube 100 includes a central tube portion (e.g. FIG. 3A, FIG. 4) having a C-shape cross-section (e.g. the exemplary C-shaped heat exchanger tube of FIG. 1). A pair of tube ends includes the C-shape cross-section (e.g. FIG. 6, FIG. 8G) or a different cross-section (e.g. the C-shaped ends of FIG. 7A). The heat exchanger tube can include a transition portion (e.g. FIG. 6, FIG. 8G, FIG. 8A, FIG. 8B, FIG. 8C) between the C-shape cross-section of the central tube portion and the circular cross-section.

Figure 9A:
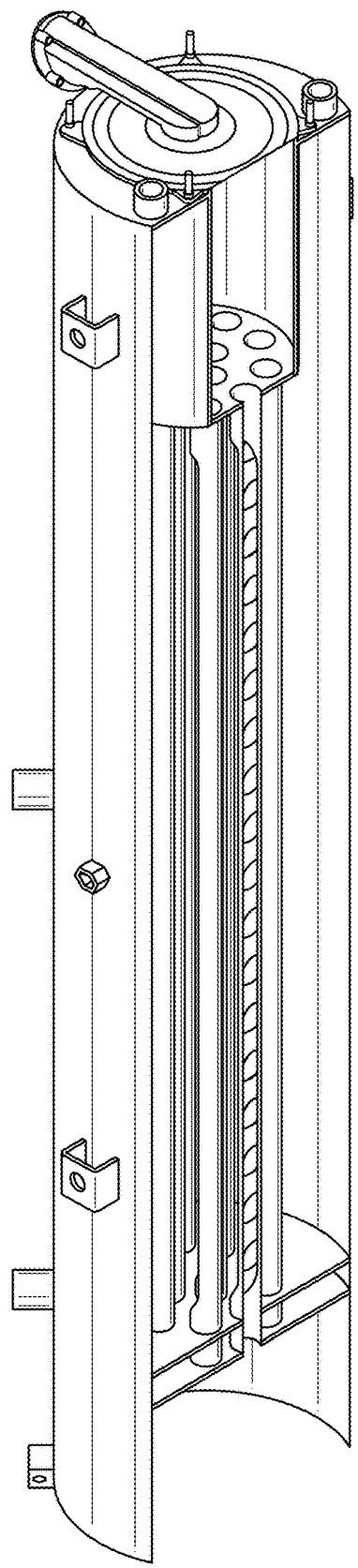
FIG. 9A is a drawing showing a section view of an exemplary heat exchanger with C-shaped heat exchanger tubes.
Figure 9B:
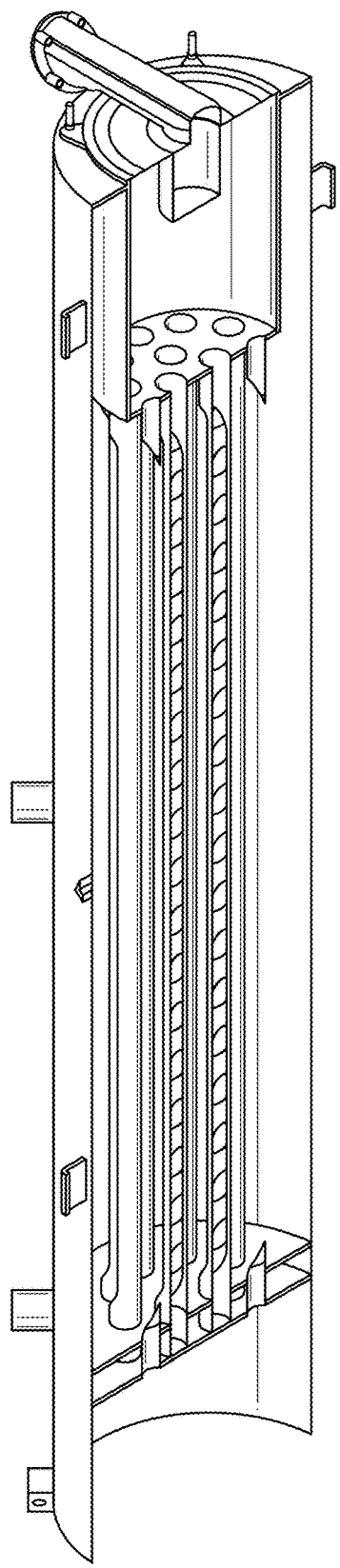
FIG. 9B is a drawing showing a section view of another exemplary heat exchanger with C-shaped heat exchanger tubes.

Exemplary heat exchangers: As described hereinabove, a plurality of heat exchanger tubes such as mounted in tube sheets, provide a heat exchanger tube assembly. Typically, the heat exchanger tube assembly is mounted within a heat exchanger body, such as a heat exchanger canister. FIG. 9A is a drawing showing a section view of an exemplary heat exchanger having a heat exchanger tube assembly with the new C-shaped heat exchanger tubes of the Application. FIG. 9B is a drawing showing a section view of another exemplary heat exchanger having a heat exchanger tube assembly with the new C-shaped heat exchanger tubes of the Application. In both cases, the hot water exits the heat exchanger at the top of the heat exchanger canister.

Data and simulations described hereinabove can be supplied on a computer readable non-transitory storage medium. A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A heat exchanger tube comprising:
a central tube portion having a C-shape cross-section; and
a pair of tube ends comprising said C-shape cross-section or a different cross-section;
wherein said central tube portion comprises a plurality of embossed patterns;
wherein said embossed patterns comprise a series of periodic embossed patterns;
wherein said series of periodic embossed patterns comprise an alternating series of side embossed pinching and middle embossed pinching; and
wherein said series of periodic embossed patterns cause an alternating flow pattern of a gas or fluid flowing through said heat exchanger tube alternately between both sides and a middle of said C-shape cross-section.

2. The heat exchanger tube of claim 1, wherein said different cross-section comprises a circular cross-section.

3. The heat exchanger tube of claim 2, further comprising a transition portion between said C-shape cross-section of said central tube portion and said circular cross-section.

4. The heat exchanger tube of claim 1, wherein said series of periodic embossed patterns cause an alternating flow pattern of a gas or fluid flowing through said heat exchanger tube.

5. The heat exchanger tube of claim 1, wherein said series of periodic embossed patterns create a plurality of microchannels which cause a laminar flow.

6. The heat exchanger tube of claim 1, wherein said heat exchanger tube comprises a hot water heater heat exchanger tube.

7. A heat exchanger tube comprising:
a central tube portion having a C-shape cross-section and a series of periodic embossed patterns comprising an alternating series of side embossed pinching and middle embossed pinching; and
a pair of tube ends comprising said C-shape cross-section or a different cross-section; and
wherein said series of periodic embossed patterns cause an alternating flow pattern of a gas or fluid flowing through said heat exchanger tube alternately between both sides and a middle of said C-shape cross-section.

8. A heat exchanger tube assembly of heat exchanger tubes according to claim 7 comprising:
a pair of tube sheets; and
a plurality of C-shaped heat exchanger tubes according to claim 7, said plurality of C-shaped heat exchanger tubes disposed between said pair of tube sheets, each C-shaped heat exchanger tube comprising:
a central tube portion having a C-shape cross-section, and
a pair of tube ends comprising said C-shape cross-section or a different cross-section, each tube end of each tube mechanically coupled to a tube sheet.

9. The heat exchanger tube assembly of claim 8, wherein said pair of tube sheets comprise a plurality of circular holes to accept and mechanically couple to a round tube end cross section.

10. The heat exchanger tube assembly of claim 8, wherein said pair of tube sheets comprise a plurality of C-shaped openings to accept and mechanically couple to a C-shaped tube end cross section.

11. The heat exchanger tube assembly of claim 8, wherein said pair of tube sheets comprise a C-shaped opening nested pattern wherein at least one end of said C-shaped openings is nested into a concave part of another C-shaped opening.

12. The heat exchanger tube assembly of claim 8, wherein said heat exchanger tube assembly comprises a hot water heater heat exchanger tube assembly.

* * * * *